United States Patent Office 3,498,748

Patented Mar. 3, 1970

3,498,748

PREPARATION OF MAGNETIC FERRIC OXIDE

Harry S. Greiner, Bethlehem, Pa., assignor to Chas. Pfizer & Co., Inc., New York, N.Y., a corporation of Delaware No Drawing. Filed May 18, 1967, Ser. No. 639,303
Int. Cl. C01g *49/06;* C04b *35/00;* H01f *1/00*
U.S. Cl. 23—200 8 Claims

ABSTRACT OF THE DISCLOSURE

Method for manufacturing magnetic gamma iron oxide by coating acicular crystalline particles of nonmagnetic alpha iron oxide with a hydrophobic aliphatic monocarboxylic acid of 8 to 24 carbon atoms; heating the coated particles in air at from 750 to 1200° F. whereby the alpha iron oxide is reduced and oxidized to magnetic gamma iron oxide in one continuous heating step. Gamma iron oxide so produced may be incorporated into magnetic recording members such as tape, drums or magnetic inks and possesses improved magnetic properties.

Background of the invention

This invention relates to magnetic material and to a method for producing this material. More particularly, the invention relates to a process for the preparation of ferromagnetic material for use in a magnetic impulse record member comprising a base or carrier, such as a tape, ribbon, drum or similar nonmagnetic material, coated or impregnated with a coating containing the magnetic material of this invention.

Gamma iron oxide has heretofore been found to be suitable as a magnetic material for incorporation into magnetic record members to be used for impulse recording purposes. In particular, an iron oxide having a cubic lattice structure and an acicular crystalline form, where the length to width ratio is at least 2.5 to 1 possesses the best magnetic properties. While alpha ferric oxide, $Fe_2O_3$, in either the hydrated yellow form, $Fe_2O_3 \cdot H_2O$ or the dehydrated red form, possesses an acicular crystalline form, these oxides are non-magnetic. It has been found, however, that the non-magnetic alpha ferric oxide may be converted to the magnetic gamma ferric oxide. In producing the gamma iron oxide from the alpha iron oxide, it has been found, heretofore, to be necessary to utilize a two or three step heating process. Where hydrated yellow ferric oxide is used, the first step is the removal of the water of hydration from the ferric oxide. In the second step, the newly dehydrated alpha ferric oxide is heated in the presence of hydrogen, or in another reducing atmosphere, whereby it is reduced to ferrosoferric oxide. In the third step, the ferrosoferric oxide is reoxidized, in the presence of oxygen, to magnetic gamma ferric oxide. Where dehydrated red ferric oxide is used, a two-step process has been found to be necessary to convert the alpha ferric oxide to the gamma form. This two-step process corresponds to the final two steps of the three-step process which is needed where the starting material is yellow hydrated alpha ferric oxide.

The use of a three-step process for producing gamma iron oxide from hydrated nonmagnetic alpha ferric oxide significantly increases the cost and inconvenience of producing gamma $Fe_2O_3$ inasmuch as the three steps of the prior art processes are usually performed at different temperatures and in different ambient atmospheres.

Summary of the invention

The cost and complexity of manufacturing magnetic gamma ferric oxide from nonmagnetic hydrated or dehydrated alpha ferric oxide have been substantially decreased by the use of the processes of this invention. The essence of this invention is a method for making gamma iron oxide which comprises the steps of coating uniformly small particles of acicular crystalline hydrated or dehydrated alpha ferric oxide with a hydrophobic aliphatic monocarboxylic acid having from 8 to 24 carbon atoms; drying the coated oxide; heating the coated oxide particles at a temperature from 750–1200° F., in the presence of air until the particles have become reduced and oxidized to gamma iron oxide; recovering the magnetic gamma iron oxide. The preferred hydrophobic aliphatic monocarboxylic acid is coconut oil fatty acid and a preferred period for the heating step is from 0.2 to about 2.0 hours. The magnetic gamma $Fe_2O_3$ may be incorporated into magnetic impulse record members such as tape, drums, magnetic inks and similar nonmagnetic carriers.

The oxidation and reduction of alpha iron oxide to gamma iron oxide is accomplished in one heating step in the new processes and does not require two separate temperatures and gaseous environments for the reduction and oxidation steps. Where a three-step heating process has heretofore been required for producing gamma ferric oxide from hydrated alpha ferric oxide, the process of this invention accomplishes this conversion in a single heating step. The production of dehydrated alpha ferric oxide from the hydrated form occurs just before the start of the reduction portion of the one-step conversion from alpha to gamma ferric oxide. The entire process, dehydration, reduction and oxidation occurs in a single heating step, in the same ambient atmosphere, without the need for radically different temperatures.

The product of the new process is superior to the gamma iron oxide produced by conventional processes in that the new product possesses a higher ratio of remnant induction to maximum induction and a higher orientation ratio.

DETAILED DESCRIPTION OF THE INVENTION

The processes of this invention consist of four steps, namely, the coating of the hydrated or dehydrated alpha ferric oxide with a hydrophobic aliphatic monocarboxylic acid; the drying of the coated oxide; the heating of the coated oxide in the presence of air until the reduction and oxidation to the magnetic gamma iron oxide has been completed; the recovery of the magnetic gamma iron oxide.

The acicular crystalline alpha ferric oxide, which is used as the starting material of this new process, is introduced to the process as a wet hydrated yellow ferric oxide, as a dried yellow ferric oxide or as a dry red dehydrated ferric oxide. Where the wet hydrated yellow ferric oxide is used, it may be introduced as a wet precipitate which has never been dried or as a wet filter cake from the precipitation process or as a wet pigment slurry from which the excess water has been removed by decantation or in a similar form. The acicular crystalline alpha ferric oxide particles useful with this invention should have a length to width ratio of at least 2.5 and have a maximum dimension of six microns or less. Preferably the maximum dimension of the particles should be 1.0 to 1.5 microns or less and we most prefer particles having a maximum dimension of 0.5 to 1.0 micron.

The hydrophobic aliphatic monocarboxylic acid used for coating the iron oxide particles in the new process may contain from 8 to 24 carbon atoms. Preferably, the acid should contain from 10 to 22 carbon atoms and we most particularly prefer to use coconut oil fatty acid or lauric acid with the processes of this invention. In addition to these two acids, other acids which may be used, individually or in admixture, include capric, caprylic, caproic, myristic, palmitic, stearic, carnaubic, behenic, margaric, pentadecanoic, tridecanoic, undecanoic, pelargonic, nondecanoic, arachidic, lignoceric, oleic, erucic, palmitoleic, linoleic, linolenic, dehydrated castor oil acids, tall oil fatty acids and soya bean oil fatty acids.

Any of a number of coating methods may be used to coat the alpha iron oxide particles. Among these are methods which involve treatment of the particles with a mixture of a suitable monocarboxylic acid and water where the acid has been saponified with base or alkali, the treatment being followed by subsequent acidulation of the coated particle to convert the saponified acid in the coating into the free acid. Another coating method involves the use of a suitable monocarboxylic acid dissolved in a solvent. The particles are treated with the mixture of acid and solvent and the acid is deposited on the particles after which the solvent is removed by distillation.

Another method for coating the alpha iron oxide particles involves the use of a suitable acid which is rendered water-soluble by the addition of morpholine to the mixture of water and acid. The latter method is preferred for the new process and involves the use of a water solution containing from 1.6 to 10.0% of suitable monocarboxylic acid and from 0.15 to 1.5% of morpholine and sufficient water to solubilize the acid, all percentages being by weight, based on the weight of dry gamma iron oxide ($Fe_2O_3$) which is contained in the original alpha ferric oxide slurry.

The iron oxide particles may be coated with monocarboxylic acid by slurrying the particles with the solution of morpholine, acid and water. When a water-wet hydrated yellow ferric oxide is used, the solution is added to the slurry of alpha iron oxide slowly, with agitation, and the spent solution is removed by decantation after the coating process is complete. While this coating procedure is most suitable where the initially charged iron oxide is wet or is a precipitate which has never been dried, when the iron oxide charged is dry, it may be necessary to use more severe methods to mix the oxide particles intimately with the water, morpholine and acid mixture in order to insure that the particles become completely coated with the acid. This intimate mixing may be accomplished in a device, such as a Simpson Mix-Muller manuafctured by The National Engineering Company, in which the particles and the liquid mixture are mechanically forced together to obtain intimate mixing.

After coating, the particles are seperated from the residual mixture of acid, morpholine and water by filtration and are dried. The drying period varies with the quantity of iron oxide and is readily determinable by one skilled in the art. The drying temperature is not critical and may vary within a large limit. The drying temperature should not, of course, exceed the decomposition temperature of the monocarboxylic acids used. Typical temperatures are between 135 and 165° F. with the midpoint temperature preferred.

The dry coated particles of alpha iron oxide are then heated in air to convert them to the magnetic gamma iron oxide form. The conversion from the nonmagnetic alpha form to the magnetic gamma form of ferric oxide probably takes place through the reduction of the alpha ferric oxide to ferrosoferric oxide, $Fe_3O_4$, and the subsequent oxidation of the $Fe_3O_4$ to the magnetic gamma form of ferric oxide, $Fe_2O_3$. While prior art processes effectuate the reduction of the alpha oxide by use of a gaseous reducing atmosphere, such as a hydrogen or vaporized fuel oil blanket, or by use of a reducing environment created by mixing carbon or fuel oil with the iron oxide particles, it is probable that the reduction of the coated particles in the processes of this invention is effectuated by the reducing environment created by the coating of the particle as the coating, itself, is oxidized while the particle is being reduced. The coating, while decomposing to carbon monoxide or other oxidation products, creates a reducing environment in which the alpha iron oxide is reduced. The oxidation of the newly reduced particle to the gamma ferric oxide form can then take place in the air which is able to surround the particle after the coating has decomposed. Prior art processes usually require that the oxidation be performed at a different temperature level than the reduction and that air be substantially excluded from the particles during the reduction procedure.

Other organic materials, besides the hydrophobic aliphatic monocarboxylic acids, may be used to coat the alpha iron oxide particles prior to the one-stage reduction and oxidation to the gamma iron oxide. Suitable coating materials would include those compounds which oxidize at temperatures near the termperature at which the alpha ferric oxide can be reduced, and which oxidize in a manner which will cause the alpha ferric oxide particle to be enveloped in an effective reducing atmosphere.

The heating temperature, the duration of the heating period and the air flow rate during heating are all interrelated in the performance of this invention and should be carefully controlled in order to effectuate the new processes properly. Those skilled in the art will be able to adjust the levels of these variables in order to obtain optimum product quality with the new processes in each particular case. The levels of the variables will depend on the coating material used, the type of heating equipment available, the particle size of the iron oxide and the solids feed rate as well as upon other variables.

Generally, temperatures between 750° F. and 1200° F. are useful. Initial temperatures from 1050° F. to 1150° F. are preferred where a rotary kiln or other mode of agitated heating is used. Where agitated heating modes are used, the initial temperature usually corresponds to the maximum temperature. Where stationary heating modes are used, temperatures from 750° F. to 1100° F. are preferred. The duration of the heating period may range from about 18 minutes to about 2 hours. The air flow rate during heating must be set to avoid under-reduction, over-oxidation or over-heating. It may be necessary to adjust the air flow rate during the heating step for particular modes of operation. Typical air rates may vary from one to five cubic feet per hour per pound of coated alpha ferric oxide fed per hour.

The devices used for heating, reducing and oxidizing the coated particles may provide means for enabling the particles to move gradually through the heating zone from the entrance to the exit in a continuous fashion or, on the other hand, may maintain the particles in a substantially stationary position in the apparatus. Where a continuously fed device, such as an indirectly heated rotary kiln, is used, the air supply may be fed in counterflow to the direction of movement of the particles and, in addition, a temperature gradient may be created along the path of movement of the particles with different temperatures existing at different points, on the flow path. Where a rotary kiln is used at an entrance temperature of about 1100° F., outlet temperatures in the neighborhood of 780° F. are found to be useful. Where a batch-type heating device is used, a temperature gradient is not usually present and the temperature required for optimum product quality is usually below 1100° F. Use of the batch-type heating devices may require that the coated particles be distributed in a shallow layer in order to allow the air to reach all the particles being heated.

The product, which is substantially magnetic gamma $Fe_2O_3$, is recovered from the heating device and may be utilized directly in magnetic recording device such as tapes or drums or magnetic inks. It is often preferable to densify the product by removing the air which may be trapped between the particles. This may be done by mechanical agitation of the particles.

In order to obtain the required magnetic properties, the products of this invention should possess suitable magnetic properties. A value of $H_c$ of at least 200 oersteds and a value of $B_r$ of at least 1700 gauss are required, the properties being measured using a field of 1000 oersteds. The ratio of $B_r$ to $B_m$ should be as high as possible and useful material, produced by this invention, cannot have a $B_r/B_m$ ratio of less than 0.35. The meaning of these symbols is given below.

The following examples are provided by way of illustration and should not be interpreted as limiting this invention, many variations of which are possible without departing from the spirit or scope thereof.

EXAMPLE I

A wet filter case, consisting of 100 lbs. of hydrated yellow alpha iron oxide which had never been dried after precipitation, was slurried with 100 gallons of water. In a separate tank, five lbs. of coconut oil fatty acid was combined with 30 gallons of water and 1 lb. of morpholine and the mixture was heated to 130° F. and agitated for a period of about 20 minutes. The mixture of morpholine, water and coconut oil fatty acid was slowly added to the iron oxide slurry at a rate of about 2–3 gallons per minute and the combined mixture was agitated for about one hour. The slurry was filtered and the filter cake dried at 150° F.

After drying, the dried oxide was passed through a hammer mill and fed to a continuous rotary kiln at a rate of between 8 and 10 lbs. per hour. The charging end of the kiln was maintained at a temperature of about 1100° F. and a stream of air was flowed countercurrently through the kiln at 30 cubic feet per hour. The residence time of the dried oxide in the kiln was 20–30 minutes.

The gamma iron oxide obtained with the process manifested the following magnetic properties using a 1000 oersted field for testing:

Coercive force ($H_c$)=290 oersteds
Residual induction ($B_r$)=1990 gauss
Maximum induction ($B_m$)=3510 gauss
$B_r/B_m$=0.76 where the coervice force ($H_c$) is the magnetizing force which must be applied to a magnetic material in a direction opposite to the residual induction to reduce the induction to zero; the residual or remnant induction ($B_r$) is the magnetic induction corresponding to zero magnetizing force in a magnetic material which is in a symmetrically cyclically magnetized condition; and $B_m$ is the maximum magnetic induction obtained at the field strength used for the test.

The resultant gamma iron oxide was then densified to a tapped density of 10.8 grams per cubic inch and was combined with a binder, and ground into a magnetic tape formulation which was then tested for magnetic tape characteristics. The results of the tests are shown in the table below together with the results for the same tests as performed on a standard commercial magnetic tape coating composition.

| | Standard tape | New tape |
|---|---|---|
| Grinding time (hours) | 48 | 48 |
| Peak bias | 5.7 | 5.3 |
| Frequency response (decibels): | | |
| 100 cycles | −1.4 | −0.6 |
| 1 kilocycle | −1.0 | −0.2 |
| 8 kilocycles | 2.2 | 2.3 |
| 10 kilocycles | 2.5 | 2.7 |
| 15 kilocycles | 5.1 | 5.0 |
| Output at 3% total harmonic distortion (decibels) | 5.1 | 5.6 |
| 1–5 kilooycle noise A.C. (decibels) | −65.8 | −66.5 |
| 1–5 kliccycle noise D.C. (decibels) | −61.3 | −62.5 |
| Saturated output 500 cycles (decibels) | 13.4 | 13.9 |
| Saturated output 15 kilocycles (decibels) | −4.4 | −5.0 |
| Resistance, K megohms | 40 | 20 |
| Film thickness, mils | 0.450 | 0.450 |
| Orientation ratio | 3.19 | 4.76 |
| Print-thru | 54.0 | 52.0 |
| Tape $H_c$ (1 kilooersted) | 288 | 265 |
| $B_r/B_m$ (1 kilooersted) | 0.76 | 0.79 |

The term "densified" denotes a procedure, known to the skilled practitioner in the art, whereby the gamma iron oxide is physically agitated and compressed to eliminate any air which may be entrained in the interstices between the particles of iron oxide. The tapped density is the density which is manifested by the gamma iron oxide when it is placed in a container which is then tapped until the volume which the solid occupies has ceased to decrease.

The measurements which are exemplified in the table above are those which are conventional in the magnetic recording tape art. The frequency response was measured at an input of −20 decibels and the output is given in decibels below or above the input. The input signal is 20 decibels below zero output on an Ampex Recorded Alignment Tape. This tape is produced by the Ampex Corporation of Redwood City, Calif. The test of 1–5 kilocycle Noise A.C. was made by measuring the 1–5 kilocycle band pass using an Ampex Model 300 Tape Recorder in the record mode at a tape speed of 7.5 inches per second with the input to the recorder amplifier shorted and with no signal being fed to the unit. The 1–5 kilocycle Noise D.C. is made in a similar fashion except that the recorder is used in the playback mode and a magnet is used to saturate the tape before it passes the reproduction head. The resistance of the tape was measured on a General Radio Megomher, Model 1862–B, manufactured by the General Radio Company. The orientation ratio is a measure of the degree to which the magnetic particles become aligned in the direction of tape length when magnetic means are used to accomplish the orientation. Particles with a higher orientation ratio will align themselves more easily and more completely in the direction of the applied magnetic field. The ratio $B_r/B_m$ represents the ratio of residual induction to maximum induction. The degrees to which this ratio approaches one is indicative of the squareness of the hysteresis loop and of decreased switching time. $H_c$ represents the tape coercive force. The other measurements reported in the table above are also standard test results which require no amplification.

EXAMPLE II

Where the procedures of Example I are repeated using equivalent amounts of caprylic acid, lauric acid or lignoceric acid, a gamma iron oxide product is obtained which manifests properties substantially identical to the properties of the powder made by the procedures of Example I.

EXAMPLE III

Where the procedures of Example I are followed, except that the coated alpha iron oxide is fed to the rotary kiln at a rate of 12–15 lbs. per hour, at about the same residence time, a gamma iron oxide product is obtained with properties substantially identical to those of the powder made by the procedures of Example I.

EXAMPLE IV

Where the procedures of Example I are followed, except that the coated alpha iron oxide has a residence time in the rotary kiln of about 100 to 120 minutes, a gamma iron oxide product is obtained with properties substantially identical to those of the power made by the procedures of Example I.

EXAMPLE V

Where the procedures of Example I are followed, except that ammonium hydroxide is used, instead of morpholine, to emulsify the coconut oil fatty acid, the resultant gamma iron oxide product manifests properties substantially identical to those of the product made by the procedures of Example I.

EXAMPLE VI

The procedures of Example I are followed, except that the coated alpha iron oxide is heated in a stationary oven operating at about 950° F. The coated powder is arranged in a layer about 0.25 inch deep and is heated for about one hour. The resultant gamma iron oxide product manifests properties substantially identical to those of the product of the procedures of Example I.

EXAMPLE VII

A dry filter cake, consisting of 100 lbs. of hydrated yellow alpha iron oxide, was placed in a Simpson Mix-Muller manufactured by The National Engineering Company of Chicago, Ill., and intimately mixed or chased with a water emulsion of coconut oil fatty acid and morpholine. The emulsion consisted of 2.6 gallons of water, 0.3 lb. of morpholine and 1.6 lbs. of coconut oil fatty acid. An additional 6.6 gallons of water was added and the mix chased for 45 minutes. At the end of this period, 33.3 lbs. of dry filter cake was added and the mixing continued for another 45 minutes, during which time small round pellets were formed which were subsequently dried at 150° F.

The resulting material was placed in a rotary kiln maintained at a temperature of 1050° F. and treated in a manner similar to the procedures of Example I.

The resultant gamma iron oxide powder and the tape produced therefrom manifested properties substantially similar to those of the powder and tape of Example I.

EXAMPLE VIII

A wet filter cake, consisting of 100 lbs. of hydrated yellow alpha iron oxide which had never been dried after precipitation, was slurried with 100 gallons of water. In a separate tank, 2.5 lbs. of coconut oil fatty acid, 30 gallons of water and one lb. of morpholine were heated to 130° F. and agitated for a period of 20 minutes. The mixture of morpholine, water and coconut oil fatty acid was slowly added to the iron oxide slurry at a rate of about 2–3 gallons per minute and the combined mixture was agitated for about one hour. The slurry was filtered and the filter cake dried at 150° F.

After drying, the dried oxide was passed through a hammer mill and fed to continuous rotary kiln at a rate of 8–10 pounds per hour. The charging end of the kiln was maintained at a temperature of about 1050° F. and a stream of air was flowed countercurrently through the kiln at 30 cubic feet per hour.

The resultant gamma iron oxide was then densified to a tap density of 10.8 grams per cubic inch, combined with a binder and ground into a magnetic tape formulation which was then tested for tape characteristics. The resultant tape manifested properties substantially identical to those listed in the table of Example I.

What is claimed is:

1. A method of making magnetic gamma iron oxide which comprises the steps of (a) coating uniformly small particles selected from the class consisting of acicular crystalline alpha ferric oxide and acicular crystalline hydrated alpha ferric oxide with a maximum dimension of less than about six microns and a length to width ratio of at least 2.5 to 1 with at least one hydrophobic aliphatic monocarboxylic acid, having from 8 to 24 carbon atoms, and (b) heating said coated oxide particles at a temperature of from about 750° to about 1200° F. in the presence of air until said particles have become reduced and oxidized to a magnetic iron oxide consisting essentially of gamma $Fe_2O_3$ said gamma $Fe_2O_3$ having an $H_c$ of at least 200 oersteds and a $B_r$ of at least 1700 gauss, using a field of 1000 oersteds.

2. The method of claim 1 wherein the coating step (a) is effected by mixing the uniformly small particles of alpha ferric oxide with morpholine, water and at least one hydrophobic aliphatic monocarboxylic acid, having from 8 to 24 carbon atoms, said morpholine being present in a concentration of from 0.15 to 1.5%, by weight of $Fe_2O_3$ in said mixture, and said hydrophobic aliphatic monocarboxylic acid being present in a concentration, by weight of $Fe_2O_3$ in said mixture, of from 1.6 to 10.0%.

3. The method of claim 1 where the heating step (b) is performed over a period from about 0.3 to about 2.0 hours.

4. The method of claim 1 wherein the heating step (b) is performed at an initial temperature of 1050° F. to 1150° F.

5. The method of claim 1 wherein the hydrophobic aliphatic monocarboxylic acid is coconut oil fatty acid.

6. The method of claim 1 wherein the maximum dimension of the alpha ferric oxide particles is less than about 1.5 microns.

7. The method of claim 1 wherein the maximum dimension of the alpha ferric oxide particles is less than about 1.0 micron.

8. A method of making magnetic gamma iron oxide which comprises the steps of (a) coating uniformly small particles selected from the class consisting of acicular crystalline alpha ferric oxide and acicular crystalline hydrated alpha ferric oxide with a maximum dimension of less than about 1.5 microns and a length to width ratio of at least 2.5 to 1 with at least one hydrophobic aliphatic monocarboxylic acid having from 8 to 24 carbon atoms by mixing said alpha ferric oxide with a solution of said monocarboxylic acid and morpholine in water, said monocarboxylic acid being present in the mixture in a proportion, by weight of $Fe_2O_3$ in said mixture, of from 1.6 to 10.0% and said morpholine being present in a proportion, by weight of $Fe_2O_3$ in said mixture, of from about 0.15 to 1.5% and (b) heating said coated oxide particles with continuous agitation at a maximum temperature of from 1050° F. to 1150° F. until said particles have become reduced and oxidized to a magnetic iron oxide consisting essentially of gamma $Fe_2O_3$, said gamma $Fe_2O_3$ having a value of $H_c$ of at least 200 oersteds, a value of $B_r$ of at least 1700 gauss and having a $B_r/B_m$ ration of at least 0.35, using a field of 1000 oersteds.

References Cited

UNITED STATES PATENTS

| | | | |
|---|---|---|---|
| 2,694,656 | 11/1954 | Camras | 23—200 X |
| 2,799,599 | 7/1957 | Koch | 117—167 X |
| 3,278,440 | 10/1966 | Schuele | 252—62.56 |
| 3,399,142 | 8/1968 | Conley | 23—200 X |

OTHER REFERENCES

Noller: Chemistry of Organic Compounds, 3rd ed., Saunders Co., Phila., Pa., 1965, p. 209.

OSCAR R. VERTIZ, Primary Examiner

G. T. OZAKI, Assistant Examiner

U.S. Cl. X.R.

252—62.56